United States Patent
Schubert

[15] 3,700,345
[45] Oct. 24, 1972

[54] ECCENTRIC BORING SPINDLE
[72] Inventor: Paul Schubert, Imtobel, Germany
[73] Assignee: Cross Europa-Werk GmbH, Wendligen, Postfach, Germany
[22] Filed: May 10, 1971
[21] Appl. No.: 141,490

[30] Foreign Application Priority Data
Nov. 4, 1970   Germany......P 20 54 165.5

[52] U.S. Cl. ................408/150, 408/161, 408/143
[51] Int. Cl. .........................................B23b 47/00
[58] Field of Search......408/150, 151, 158, 161, 153,
     408/143, 147, 173, 178; 90/11 A

[56]        References Cited
           UNITED STATES PATENTS
3,516,328   7/1968   Jones et al. ................90/11 A
3,466,952   9/1969   Greenberg et al. .........408/147
2,775,147   12/1956  Schneebeli et al.........408/151

Primary Examiner—Gil Weidenfeld
Attorney—Harness, Dickey & Pierce

[57]         ABSTRACT

A driven spindle carries a boring bar which is rotatable on an eccentric axis to adjust the cutting edges. The boring bar is mounted in the spindle by at least one bushing having an elastically deformable bearing surface which can be forced against the boring bar by an incompressible pressure medium. With the pressure released, the boring bar may be rotatably adjusted. Raising the pressure will reduce or eliminate the radial play of the boring bar in the spindle.

9 Claims, 3 Drawing Figures

INVENTOR.
Paul Schubert

ECCENTRIC BORING SPINDLE

BACKGROUND OF THE INVENTION

1. Field of the Invention

The invention relates to an eccentric spindle headstock in which the driven spindle contains an eccentrically mounted boring bar, bearing a tool, which bar can be selectively twisted with respect to the spindle by means of an adjusting mechanism.

In such an eccentric spindle headstock, twisting the boring bar with respect to the spindle makes it possible to change the diameter of the circle cut by a boring tool mounted on the boring bar (for example a ceramic oxide cutting plate) with respect to the axis of rotation of the spindle. In this way it is possible selectively to bring different edges of the tool into contact with the workpiece, or to compensate for the wear developing in the tool on prolonged use and to make fine adjustments of the cutting edges when the tool is changed.

Twisting of the boring bar with respect to the spindle is effected by means of an adjusting mechanism, for example in the form of a screw mechanism actuated by a longitudinally displaceable sleeve. This takes place relatively slowly and covers only a limited angular range which is less than 360°. Nevertheless, the support for the boring bar must meet relatively severe requirements, because the precision of machining the workpiece depends thereon. The bearings must be free of play so that the advantage gained by the principle of eccentrically mounting the boring bar, namely that the bearing is disposed in immediate proximity to the workpiece, may be retained.

2. Description of the Prior Art

U.S. Pat. No. 3,438,287 discloses a rotatable tool carrying bar mounted in hydrostatic bearings which permit both axial and rotational movement, these bearings having surfaces deformable by a pressure medium to engage the bar. However, no prior art is known including a driven spindle, an eccentrically mounted boring bar with means for adjusting its eccentricity in the spindle, at least one bushing between the spindle and boring bar with an elastically deformable bearing surface which can be forced against the boring bar, and means for enabling or disenabling the eccentric adjusting means by adjusting the fluid pressure behind said bushing.

BRIEF SUMMARY OF THE INVENTION

It is the purpose of the invention to provide an eccentric spindle headstock which is distinguished by a particularly advantageous design of the means of mounting the boring bar in the spindle, wherein particularly extensive freedom from play is assured and which offers the possibility of changing the play after installation of the bearing, that is particularly to reduce play or even to clamp fast the boring bar. The ability to clamp fast the boring bar in the spindle after the eccentric spindle headstock is mounted is important because occasional vibrations of the tool may occur, which are eliminated by removing the individual possible sources of error. If after mounting it is found that such undesirable vibrations occur, it is possible to ascertain, after clamping fast the boring bar, whether the cause lies in the mounting of the boring bar in the spindle or in the mounting of the spindle in its housing. When machining with ceramic oxide cutting elements, any occurrence of vibrations must be eliminated.

For this purpose, the eccentric spindle headstock according to the invention has the boring bar mounted in the spindle by at least one bearing sleeve with an elastically deformable bearing surface, and the bearing surface can be forced against the boring bar by means of an incompressible pressure medium. Expediently, in the region of its outer generated surface, the bearing sleeve is fashioned with a peripheral annular pressure chamber into which the pressure medium can be forced. The pressure medium itself may be lubricating grease and the design is preferably such that the pressure medium can be introduced into the bearing sleeve through at least one pressure channel, into which a plug is screwed at one end.

With the new eccentric spindle headstock, it is possible to adjust the bearing play by making simple changes in the applied force exerted by way of the pressure medium on the elastically deformable bearing surface of the bearing sleeve, particularly since, when lubricating grease is used as the pressure medium, very simple structural relations obtain.

BRIEF DESCRIPTION OF THE DRAWINGS

The drawing shows an embodiment of the object of the invention. Thus.

DESCRIPTION OF THE PREFERRED EMBODIMENT

Figure 1:
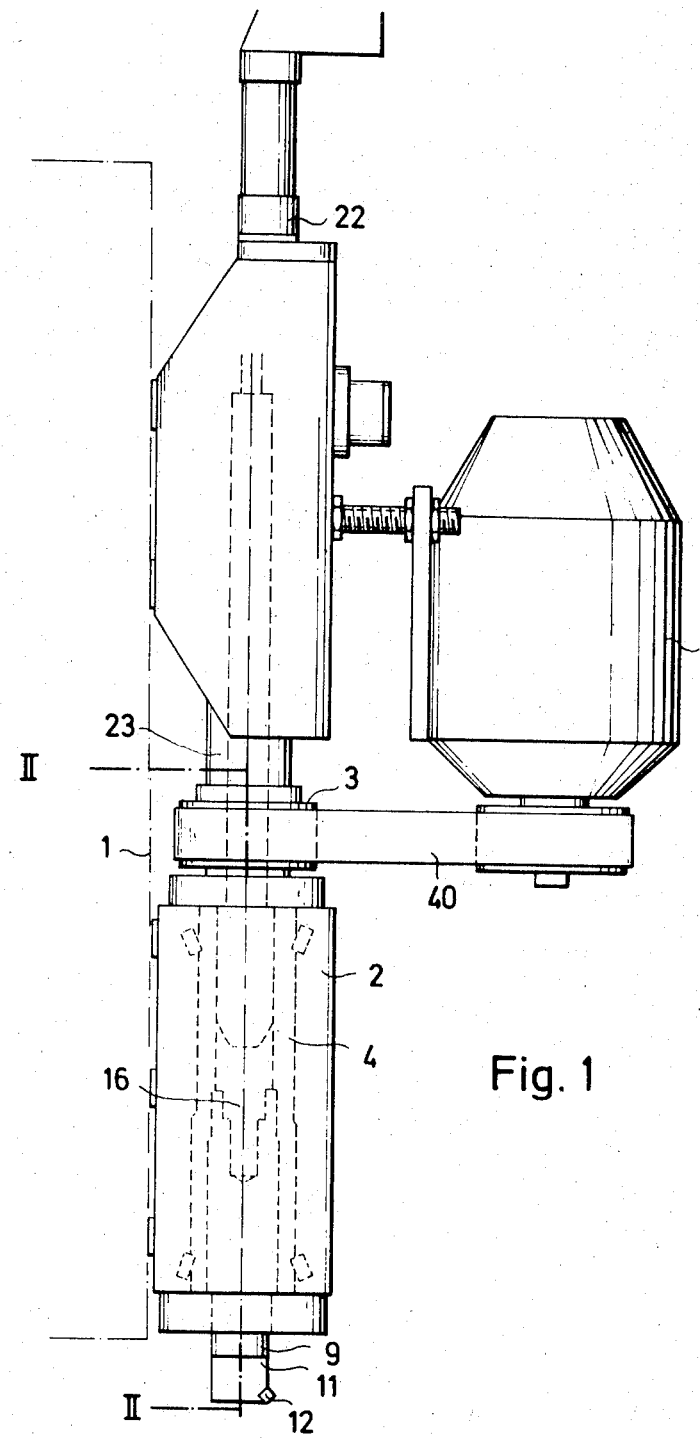
FIG. 1 shows an eccentric spindle headstock according to the invention, as seen from the side.
Figure 2:
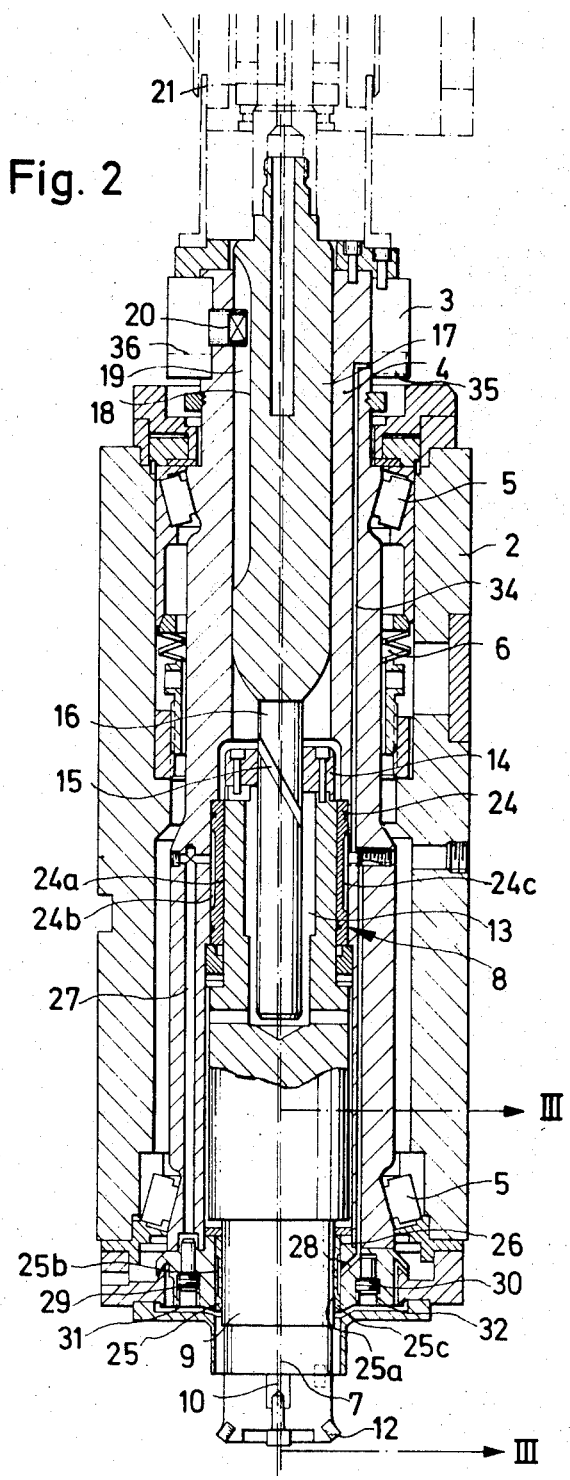
FIG. 2 shows the spindle of the eccentric spindle headstock according to FIG. 1, in axial section, with its housing, as seen from the side, corresponding to the line II—II of FIG. 1.
Figure 3:
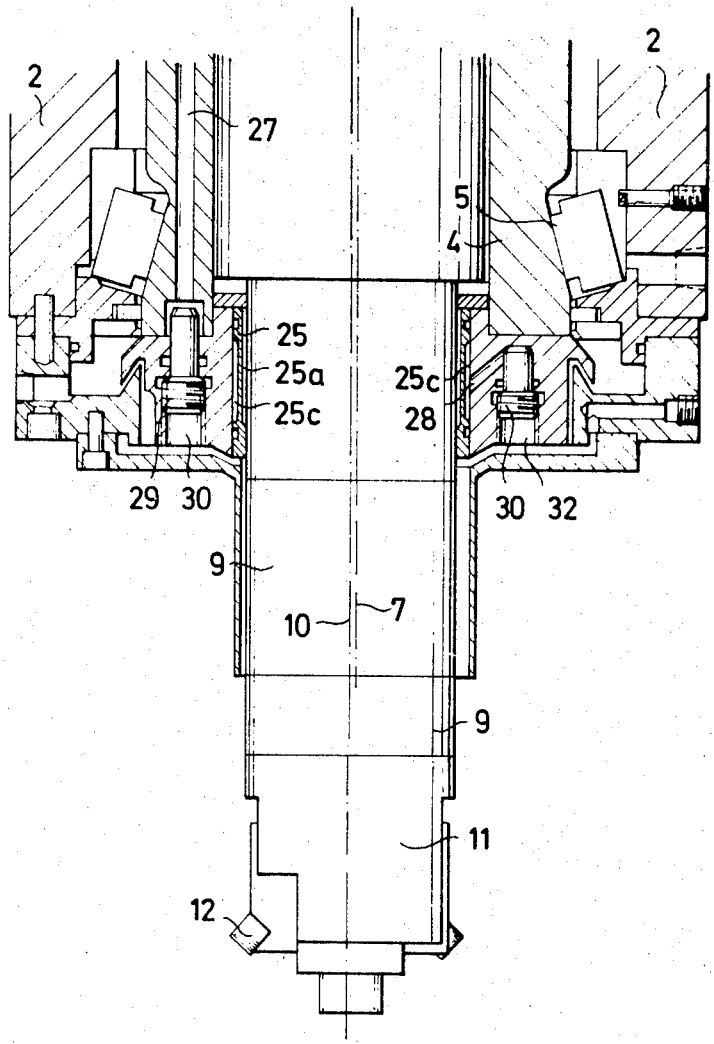
FIG. 3 shows the mechanism according to FIG. 2, cut off along the line III—III of FIG. 2, as seen from the side, on a different scale.

The eccentric spindle headstock depicted in FIG. 1 is mounted on a carriage, partially indicated in outline by 1. The spindle, rotatably mounted in a housing 2, is driven by an electric motor 50, by means of a belt 40 and a belt pulley 3. The spindle coupled with the belt pulley 3 is indicated by 4, particularly in FIG. 2. It is mounted in housing 2 by means of two collar bearings 5, prestressed by disc springs 6. Spindle 4 is fashioned with a bore 8 which is eccentric, by a definite amount, with respect to the spindle axis of rotation, indicated by 7, and in which bore is mounted a rotary boring bar 9 the axis of which is indicated by 10. Boring bar 9 carries a boring tool 11 which is equipped with at least one cutting plate 12. Twisting of boring bar 9 with respect to spindle 4 is accomplished by means of an adjusting device in the form of a screw mechanism 13, consisting of a spindle nut 14 rigidly attached to boring bar 9 and an interacting threaded pin 16 with a steep-pitch thread 15. Threaded pin 16 has an unthreaded extension 17 in a bore 18 in spindle 4, the extension being prevented from turning by a key 20 in a keyway 19. Pin 16 is longitudinally displaceable by a hydraulic cylinder 22 (FIG. 1) connected to extension 17 by a sleeve indicated at 21. Hydraulic cylinder 22 and sleeve 21 are provided with stops (not shown) which are disposed in a housing 23 enclosing sleeve 21, and by means of which the axial displacement of sleeve 21, and thus of threaded pin 16, may be limited precisely to a predetermined value. The range of motion of threaded pin 16, which is limited in this manner, is converted by screw mechanism 13 into a corresponding rotation of boring bar 9, the angular orientation of which can thus be changed by predetermined amounts with respect to spindle 4.

Boring bar 9 is mounted in spindle 4 by means of two cylindrical bearing bushings 24, 25 disposed at suitable distances from one another so as to provide a stable mounting for boring bar 9. In addition, bearing bushings 24, 25 have at least one elastically deformable bearing surface 24a, 25a, the deformability of which is attained by having the bearing bushings, at 24a and 25b, fashioned with a peripheral zone of decreased wall thickness in the region of their outer surfaces. Thus, together with the cylindrical walls of bores 8 and 26 which contain the bearing bushings, annular pressure chambers 24c and 25c are formed in the region of the outer generated surface of bearing bushings 24 and 25.

Pressure channels 27 and 28, through which an incompressible pressure medium can be forced, open into pressure chambers 24c and 25c. For this purpose, lubricating grease is particularly suitable. By suitable variation of the pressure on the pressure medium a corresponding elastic deformation of the bearing surface 24a, 25a, is produced, whereby the play in the bearing is changed. This change in bearing play can go so far that boring bar 9 is clamped fast in the bearing bushings 24, 25, as may be expedient particularly during mounting for the reasons indicated above.

In order to be able to exert pressure on the pressure medium, the ends of pressure channels 27, 28 are closed by plugs 29, 30 screwed into corresponding threaded holes 31, 32. After pressure chambers 24c, 25c and pressure channels 27, 28 have been filled with lubricating grease (in place of which another pressure medium can be used), plugs 29, 30 are screwed in so far that the desired pressure is exerted in the elastically deformable bearing surfaces 24a, 25a.

As practical experience has shown, the pressure plugs 29, 30 make possible an extremely sensitive adjustment of the elastically deformable bearing surfaces, so that the bearing clearance also may be very accurately adjusted. The bearing bushings 24, 25 are made of conventional bearing material, for example GBZ 14.

For special applications, it is also conceivable to design the device so that the pressure medium is fed to the corresponding pressure chambers from outside, in a controlled manner. When adjustments are being made, the deformable bearing surfaces are not subjected to load; during machining operations, however, the pressure chambers are subjected to the pressure of the medium, and thus boring bar 9 and spindle 4 are rigidly clamped together. In this case, the pressure medium is supplied via channels 34 and a stuffing-box 35, as is shown, for example, in broken lines in FIG. 2. Belt pulley 3 is correspondingly shortened axially, as is indicated by a broken line 36.

What is claimed is:

1. In combination, a driven spindle, an eccentric bore in said spindle, a tool-carrying boring bar extending through said bore, means preventing substantial axial movement of said boring bar with respect to said spindle, at least one bushing disposed in said bore and surrounding said boring bar, means for selectively rotating said boring bar within said spindle bore to adjust the eccentricity of said tool with respect to the spindle axis, an elastically deformable bearing surface on said bushing, a chamber disposed between the bushing and spindle and surrounding said surface, an incompressible fluid in said chamber, and means for adjusting the pressure of said fluid, whereby said deformable bearing surface may be moved between an inner position in which it engages said boring bar to prevent radial play thereof and to disenable said eccentric adjusting means, and an outer position in response to reduction of fluid pressure to permit rotation of said boring bar and therefore enable said eccentric adjusting means.

2. The combination according to claim 1, said elastically deformable bearing surface being formed by a reduction in the outer diameter of said bushing.

3. The combination according to claim 2, said reduction in outer diameter forming a peripheral annular pressure chamber into which the pressure medium can be forced.

4. The combination according to claim 1, there being two such bushings in axially spaced relationship.

5. The combination according to claim 1, said means for conducting fluid to said chamber comprising a channel in said spindle and an adjustable pressure plug threadably mounted in the outer end of said channel.

6. The combination according to claim 5, there being two of said bushings in an axially spaced relation, with a channel and an adjustable pressure plug for each bushing.

7. The combination according to claim 1, further provided with means for supplying said chamber with fluid comprising a channel leading through the spindle to the outside, and a stuffing box at the outer end of the channel for controlling the pressure exerted on said surface.

8. The combination according to claim 7, there being two such bushings in axially spaced relation, said channel leading from the stuffing box to the surfaces of both of said bushings.

9. The combination according to claim 8, said surfaces being formed by reduced outer diameters in said bushings which form peripheral annular pressure chambers.

* * * * *